Nov. 27, 1945.    M. E. MOORE    2,389,866
APPARATUS FOR MAKING GRAVITY MEASUREMENTS
Filed June 10, 1939    2 Sheets—Sheet 1

WITNESS:

INVENTOR
Morton E. Moore
BY
Busser & Harding
ATTORNEYS

Nov. 27, 1945.    M. E. MOORE    2,389,866
APPARATUS FOR MAKING GRAVITY MEASUREMENTS
Filed June 10, 1939    2 Sheets-Sheet 2

Patented Nov. 27, 1945

2,389,866

UNITED STATES PATENT OFFICE 2,389,866

APPARATUS FOR MAKING GRAVITY MEASUREMENTS

Morton E. Moore, Prospect Park, Pa., assignor to Sun Oil Company, Philadelphia, Pa., a corporation of New Jersey Application June 10, 1939, Serial No. 278,565

11 Claims. (Cl. 73—382)

This invention relates to an apparatus for making gravity measurements, and particularly to a type of apparatus designed for prospecting by the gravitational method. This application is in part a continuation of my application Serial No. 230,286, filed September 16, 1938.

It is known that by making measurements of the variations of gravitational force at the surface of the earth and taking into account suitable corrections for elevation, latitude, etc., the small residual variations may be accounted for by differences in subsurface structure and, therefore, that such variations are indicative of subsurface structures which may be of commercial importance in their indications, for example, of the presence of oil fields. Gravity measurements have been made by the use of various types of apparatus, such as pendulums, torsion balances, and so-called gravity balances in which the attraction of gravity on a suitable mass is measured with a high degree of accuracy. The pendulum and torsion balance types of apparatus have disadvantages in that a relatively long time is necessary for the making of a measurement at any particular station. On the other hand, the gravity balance type of apparatus usually derives its sensitivity through a labilizing element so that it operates under conditions approaching unstable equilibrium and must be of such sensitive nature as to be rather difficult to transport and operate without damage. For commercial work, of course, portability is a major consideration.

It is the object of the present invention to provide a gravity measuring instrument of the second type referred to above, but which is of relatively rugged construction, though it has a high degree of sensitivity. The apparatus is also readily adjustable to modify its sensitivity, and when adjusted will maintain its adjustment and sensitivity.

The general object of the provision of a rugged and highly sensitive instrument and subsidiary objects relating particularly to details of construction will be apparent from the following description read in conjunction with the accompanying drawings, in which.

Figure 1:
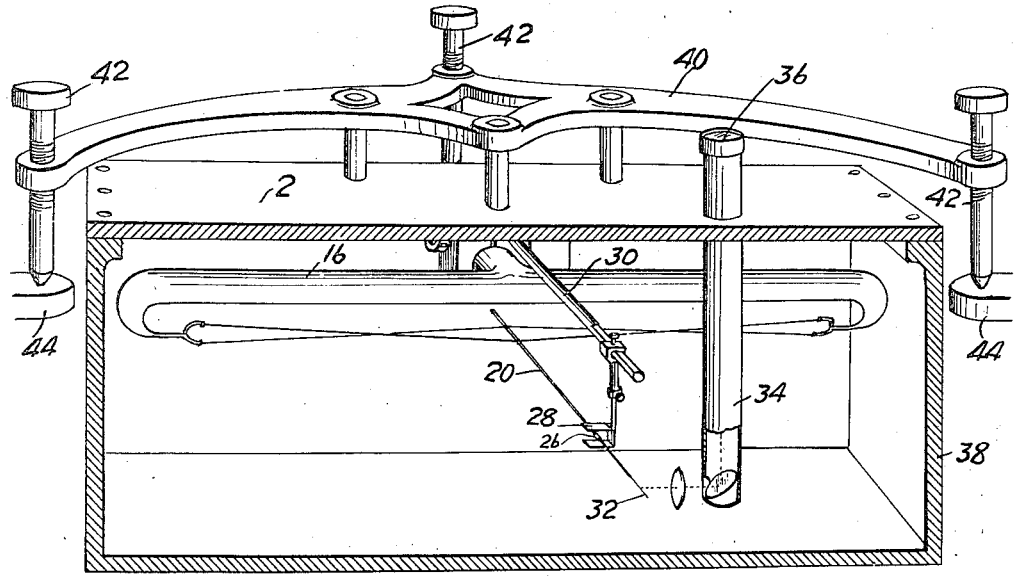
Figure 1 is a sectional perspective view showing operating and adjusting parts of the apparatus.

The apparatus is illustrated as comprising a plate 2 in the nature of a cover for an air-tight container, which plate is provided with a downwardly extending lug 4 to which a block 6 is angularly adjustably secured by means of a threaded spindle extending through the lug 4 and adapted to be clamped in adjusted position by a nut 10. To the block 6 is secured by means of a block 12 and suitable clamping screws the cylindrical extension 14 of the main supporting element 16 of the moving system. The ends of this supporting element 16 are inturned, as indicated at 18 and they support a beam 20 by means of fibers 22, which are connected at their ends to forked elements 24 connected to the inturned ends 18.

All of the portions of the apparatus 14, 16, 18, 20, 22 and 24 are formed of integrally united fused quartz. The element 16 is preferably either a rectangular quartz frame or, as illustrated, a heavy quartz rod fused to the extension 14, which is clamped. The rod 16 is reduced at its ends at 18 and has fused to these ends the forked members 24. The thin fibers 22 are fused to the members 24 and the beam 20 to provide the beam suspension, the nature of which will be hereafter more fully described.

Figure 3:
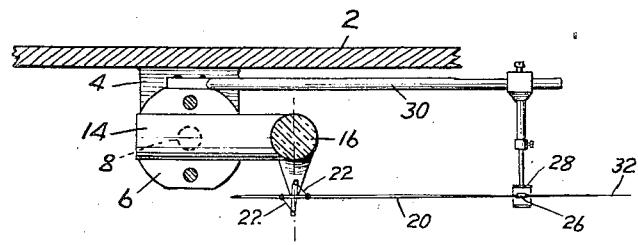
Figure 3 is a vertical section taken on the plane indicated at 3—3 in Figure 2.

The beam 20 is provided with a thimble 26 of platinum or similar metal adapted to play between stops formed by the arms of a platinum or other metallic element 28. This element 28 is desirably secured to a rod 30 extending horizontally as indicated in Figures 1 and 3.

The beam 20 is provided with an integral very fine extension 32 in the form of a quartz fiber adapted to be observed by means of a microscope arrangement indicated at 34 provided with a suitable scale in conventional fashion viewed by the eye-piece 36, which is located above the plate 2.

The plate 2 forms the top of a box 38 enclosing the moving parts, which have been described, as well as such necessary auxiliary apparatus as, for example, a sensitive level not shown. The plate 2 and the box 38 and contained elements supported by it are carried by a spider 40 into which are threaded three adjusting screws 42 bearing on members 44 of a suitable outer housing which is of conventional type and need not be illustrated.

In order to secure the necessary sensitivity and maintenance of conditions, various matters must be taken into account. For example, the entire apparatus is enclosed within a thermostatically controlled chamber insulated and heated to maintain the temperature within such close limits as the requirements of portability permit. In order to avoid inaccuracies due to convection air currents and, as a secondary matter, to promote damping and the discharge of any electrostatic charges which may accumulate, the box 36 is evacuated so that the pressure therein is of the order of a few millimeters. The purpose of the metallic thimble 26 and stops 28 is to prevent any contact potentials arising when the beam is arrested by the stop. It is found that if the quartz portion of a beam contacts quartz stops sticking of the beam to the stops may occur. Hence, the metal elements are provided. The spacing between the upper and lower stops is such as to prevent any substantial movement of the beam which might result in damage to its suspending system. Other precautions may be taken in accordance with the usual practice common in the operation of this type of sensitive instrument. It has been found that quartz is the best material for the construction of this instrument because of its low temperature coefficients, and its low elastic hysteresis and fatigue properties.

Figure 4:
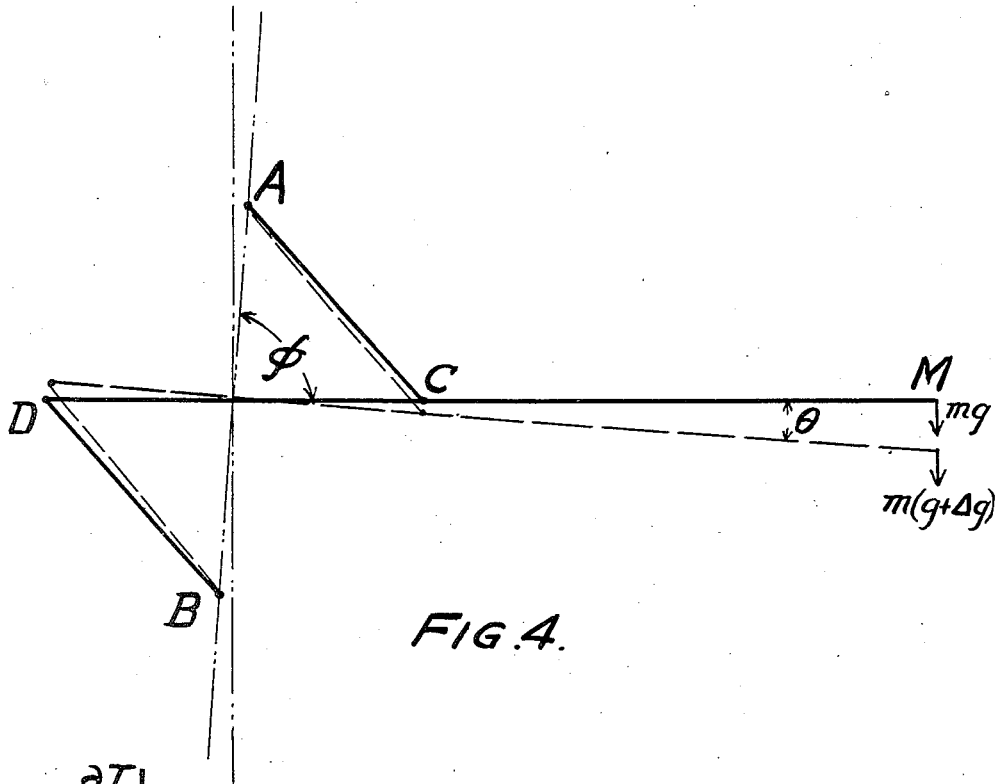
Figure 4 is a diagram in the nature of a vertical section longitudinally of the beam illustrating particularly the operation of the apparatus and its adjustment.

The arrangement of the fibers 22 with respect to the beam 20 and the supporting means is of primary importance in securing a device which has a long range of stability and at the same time extremely high sensitivity. As will be evident from the figures four fibers 22 are provided symmetrically arranged in pairs on the two sides of the beam. Extending from opposite sides of the beam away from its end 32 are two fibers symmetrically arranged and extending downwardly to the lower members of the supporting forks 24. Forwardly of these there are the two other fibers which extend upwardly and rearwardly to the upper members of the forks 24. The arrangement of these fibers and their relationship to the beam are best illustrated in Figure 4, which is a vertical section through the beam indicated at DM looking toward the supporting points A and B at one side of the beam, the fibers on that side being indicated at AC and BD. It will be evident that the symmetrical arrangement of the fibers on the other side of the beam will prevent any free lateral movement of the beam and hence consideration of it may be substantially reduced to a diagram such as illustrated in Figure 4, taking into account only the forces having a vertical and a horizontal component in the direction of extension of the beam.

For simplicity in preliminary discussion, it will be assumed that the arrangement is substantially that of Figure 4, in which the two fibers AC and BD are of substantially the same length and, when the beam is horizontal, make substantially the same angles with it. The distance AB will also be assumed to be substantially equal to the distance CD. The center of gravity of the beam is at M, at which point there acts the downward force $mg$.

Assume first that the beam is horizontal and that the angle $\theta$ is zero and that the parts occupy the positions shown in full lines in Figure 4. Under such conditions, equilibrium will exist when the horizontal and vertical components of forces acting on the beam are zero and the torque upon the beam about any point is also zero. Under these conditions of equilibrium, the fibers AC and BD will, of course, be stretched under tension. For simplicity let it also be assumed initially that the fibers are so attached under these conditions that substantially no initial torsion exists therein.

Assume now that the axial relation due to gravity is increased, for example, by the transportation of the apparatus to another locality or by a change in its location so that the acceleration now has a value $g+\Delta g$. The result will be an increase in the force exerted downwardly at M and equilibrium must be attained by a readjustment to the position indicated in the dash lines in Figure 4.

It will be noted that this new equilibrium involves several factors. First, since the tensions of the fibers will necessarily be increased, they will become elongated. Secondly, due to their elongation and the maintenance of the constant spacing CD on the beam, their angles of action on the beam projected in the vertical plane in which Figure 4 is taken will substantially change. Additionally, the fibers will have been twisted somewhat between their fixed points of attachment and their points of attachment to the beam, this twisting being substantially through an angle $\theta$.

The effects of these various changes must sum up to balance the increased torque due to the increase in the downward force at M. The change of clockwise torque as viewed in Figure 4 (the clockwise direction being assumed to be the positive direction for measurement of $\theta$) will be negative, and consequently the extension of the fibers will represent a stabilizing force tending to bring the beam back to its original position. Likewise, the torsion involved in the change which is illustrated will provide a stabilizing torque tending to move the beam in the negative direction of $\theta$. On the other hand, the change in the angle of application of the forces due to the fibers will represent a labilizing effect, since the change in the geometry of the system is such as to reduce the lever arms with which the tensions in the fibers act upon the beam.

These various changes of the torque in the direction of positive $\theta$ must sum up as a negative quantity in order that the system may be stable. At the same time, it will be evident that sensitivity, i. e., the change of $\theta$ to a large extent for a small change in $g$ will increase as this negative quantity approaches zero. Hence the condition for stability and sensitivity may be stated by saying that $\delta T/\delta \theta$ must be negative and must approach zero when $\theta =$ zero or has some other small value suitable for the making of sensitive measurements.

In order that the apparatus may be calibrated, it is desirable that the change in $\theta$ with respect to the change in $g$ should be linear. It will be evident that this will occur when $\delta^2 T/\delta \theta^2$ approaches zero at $\theta =$ zero.

Figure 5:
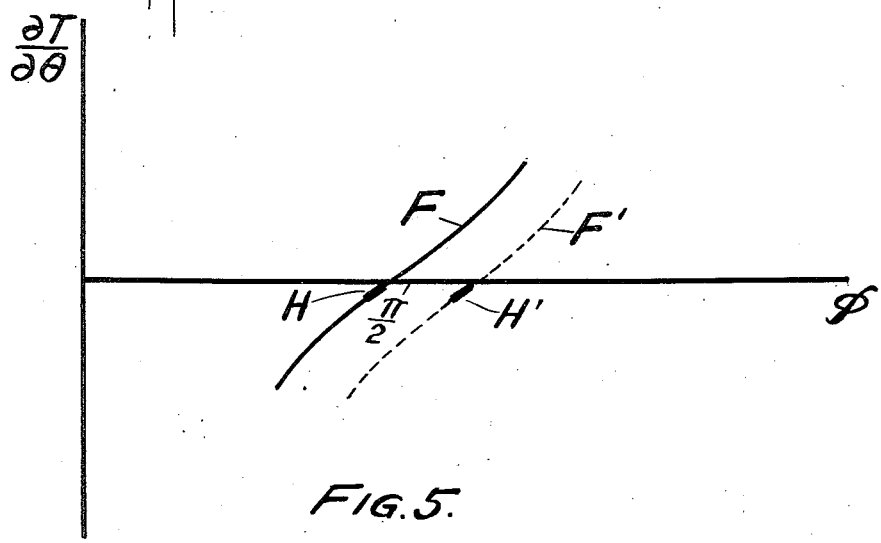
Figure 5 is a diagram of the variation of the torque with respect to the angle of slope of the beam plotted against angular adjustment of the supporting means.

The apparatus has as one of its major advantages the fact that the above desirable conditions may be attained through very small adjustment of the inclination of the support. Considering the specific assumptions made above relative to the dimensions of the system, it has been found that the stability and sensitivity may be expressed in terms of the angle $\phi$ which a line drawn through A and B makes with the horizontal. In Figure 5 the value of $\delta T/\delta \theta$ is plotted against $\phi$ and the curve at F represents the variation of this partial derivative with respect to $\phi$ when the original set-up of the apparatus has been such as to substantially eliminate torsion in the fibers in the equlibrium position. The heavy portion H of the curve F represents the region in which operation preferably takes place, this region corresponding to a negative and approximately zero value of $\delta T/\delta\theta$. It will be noted that this curve crosses the axis just short of a value of 90° for the angle $\phi$.

If initial torsion is imparted to the fibers and the beam correspondingly weighted so that in equilibrium condition the support of the beam is largely due to torsion in the fibers, there will then result the curve F' rather than F and the operating region will be as indicated at H'. It is generally found, however, that this condition is not as desirable as the first condition mentioned, since there is substantial departure from linearity. In the case of the curve F, the region H corresponds to a substantially linear variation of torque with $\theta$.

From the above discussion, while there has been considered only equilibrium condition, it will be evident that at a constant value of $g$ the sensitivity will be best indicated by the attainment of a long period of oscillation of the beam. Periods upwards of four seconds may be secured and are satisfactory for sensitive measurements. It may be remarked that these periods are secured even though a very light quartz beam is used. The weight of the beam which is permissible is limited by the consideration that the fibers must not be stressed anywhere near their breaking point. Unless they are under very much smaller stresses, jolting of the apparatus in transportation is likely to result in breakage. It is for this reason that stops are provided to limit movement of the beam.

Figure 2:
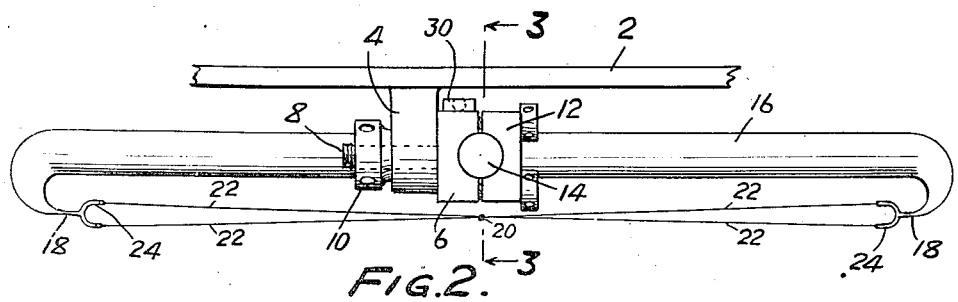
Figure 2 is a rear elevation of the essential elements of the apparatus indicating certain adjusting devices.

Referring back to Figures 1, 2 and 3, it will be evident that the adjustment of the angle $\phi$ is quite simple. The quartz portions of the apparatus may be first adjusted in the holding devices illustrated in Figures 2 and 3 to secure an approximate horizontal position of the beam. By adding or subtracting quartz from the beam by adding quartz or permitting it to run towards the supports by fusion and by changing the longitudinal tensions in the fibers, an approximate adjustment is made with the apparatus in air. By experience with these adjustments, the adjustments may be made by an operator such that when the apparatus is under vacuum and at proper temperature a close approximation to horizontal and highly sensitive conditions of the beam may be secured. The apparatus is then enclosed, the temperature adjusted and evacuation of the chamber 38 provided, whereupon final adjustment of the angle $\phi$ may be made by manipulations of the adjusting screws 42. Thus the apparatus may be brought to the sensitive operating region indicated at H or H'. A generally horizontal operating region of the beam is important, not only to minimize vibrations due to earth tremors, the major components of which are generally horizontal, but to make less critical the levelling adjustments and render them practical.

As noted above, there has been described for purposes of simplicity the quite symmetrical arrangement illustrated in Figure 4. Such an arrangement, however, is by no means essential. The relationship between the distance AB and CD may be varied within considerable limits, and it is not at all essential that the fibers should be of the same length or should have the same projections in the plane in which Figure 4 is taken. Furthermore, variations in the system may be provided in which other stabilizing or labilizing forces may be imparted to the beam. For example, on one side of the beam there may be a single supporting fiber which may or may not contribute materially to the restoring forces by its torsional rigidity, while on the other side there may be a pair of fibers arranged in accordance with the above description. In such case, the pair of fibers function to provide variations in torque by their extension, by their torsion and by their angles of action upon the beam. A single fiber on the other side may provide the lateral stability and provide stabilizing force by its torsion, and may support or depress the beam, depending upon the fashion in which it is attached to its fixed support. It has been found that the conditions described herein for the two fibers are preferable to other arrangements of the fibers which, though permitting a high degree of sensitivity, provide only a small range of stability to the end that the apparatus may rather readily become unstable and hence inoperative.

It will be evident from the above description of variations of the symmetrical system disclosed that while the angle $\phi$ has been described heretofore as the angle of the line AB with the horizontal, this angle is no more than an indication of the leveling of the rigid supporting mounting for the moving system. In other words, it is not any particular line such as AB which is of significance, but rather what is significant in adjustment of the apparatus to vary its sensitivity and maintain a long range of stability is the fine adjustment of the leveling of the mounting.

What is essentially provided in accordance with the present invention is an arrangement involving the application to a member subjected to gravitational torque of a net small stabiliz'ng torque as a result of the approximate balancing of relatively much larger labilizing and stabilizing torques, variations in which are due, respectively, to elasticity and the geometry of the system. This balancing is effected in such fashion that a small stabilizing force exists over a large range of displacement, and particularly in such fashion that an approximately linear relationship of stabilizing torque to displacement exists.

The large range of stability is important from a practical standpoint since it permits the making of very fine adjustments through such a range that measurements may be made with ease in different localities. The linear relationship of torque to displacement is important from a calibration and operating standpoint. In measurements involving a non-linear relationship it is necessary to consider whether measurements made in different localities are being actually made in the same calibration regions, so that the sensitivity is the same. If the calibration is linear, on the other hand, difficulties in this respect are avoided, i. e., it is known that throughout a wide range of operation the displacement for a given increment of torque is constant.

The mounting of the movable member, as described, in such fashion that effective spring constants of only very slight magnitude are involved, is of particular importance in securing a highly sensitive instrument and the other properties above outlined by making it unnecessary to take into account conditions which may exist at a pivot having quite substantial torsional rigidity.

Quartz has been found to be a most desirable material for this type of apparatus, since it has very low thermal coefficients of expansion and elasticity and also exhibits low elastic hysteresis and fatigue. It also has a high tensile strength and low internal friction. While other materials may be used, such as certain alloys of tungsten, where low hysteresis and fatigue are desired, such materials generally require maintenance of the temperature of the apparatus within much closer limits than does quartz. Even with quartz, however, a close control of temperature is necessary.

In the use of the apparatus it may first be calibrated, for example by checking its deflections when moved between stations of known gravity differences or by noting its deflections at various altitudes which affect the value of $g$. Thereafter the instrument may be taken to various stations and after adjustment of its level and temperature may be permitted to come to equilibrium whereupon the change in the position of the beam may be noted and deductions made of the change in the value of $g$ for the new location. The manipulations and precautions attendant on such use of the apparatus are the same as those well known to the art in the use of other gravity balances and need not be gone into in great detail.

What I claim and desire to protect by Letters Patent is:

1. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising means for exerting at one point on said member a force along a line substantially spaced from the center of oscillation of said member and having a horizontal component and a vertical downward component, and means exerting at another point on said member a second force along another line substantially spaced from the center of oscillation of said member and having a horizontal component balancing the horizontal component of the first force and having a vertical upward component balancing the vertical downward component of the first force and the force of gravity, said forces exerting compression upon the portion of the member between said points, and said lines of application of the forces varying in direction relative to said member during its oscillations.

2. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising means for exerting at one point on said member a force along a line substantially spaced from the center of oscillation of said member and having a horizontal component and a vertical downward component, and means exerting at another point on said member a second force along another line substantially spaced from the center of oscillation of said member and having a horizontal component balancing the horizontal component of the first force and having a vertical upward component balancing the vertical downward component of the first force and the force of gravity, at least one of said means serving to prevent horizontal movements of said member transverse to a line joining the points of application of said forces, said forces exerting compression upon the portion of the member between said points, and said lines of application of the forces varying in direction relative to said member during its oscillations.

3. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising a pair of filaments each of which is fixed at its ends and acts upon said member at an intermediate portion of its length deflected from a line joining its ends, one of said filaments exerting at one point on said member a force along a line substantially spaced from the center of oscillation of said member and having a horizontal component and a vertical downward component, and the other of said filaments exerting at another point on said member a second force along another line substantially spaced from the center of oscillation of said member and having a horizontal component balancing the horizontal component of the first force and having a vertical upward component balancing the vertical downward component of the first force and the force of gravity.

4. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising a pair of filaments each of which is fixed at its ends and secured to said member at an intermediate portion of its length deflected from a line joining its ends, one of said filaments exerting at one point on said member a force along a line substantially spaced from the center of oscillation of said member and having a horizontal component and a vertical downward component, and the other of said filaments exerting at another point on said member a second force along another line substantially spaced from the center of oscillation of said member and having a horizontal component balancing the horizontal component of the first force and having a vertical upward component balancing the vertical downward component of the first force and the force of gravity, said filaments serving to prevent horizontal movements of said member transverse to a line joining the points of application of said forces.

5. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising at least two filaments one of which exerts on said member at one point a force along a line substantially spaced from the center of oscillation of said member and having substantial horizontal and vertical downward components, and the other of which exerts on said member at a point spaced from the first point a second force along another line substantially spaced from the center of oscillation of said member and having substantial horizontal and vertical upward components, said forces exerting compression upon the portion of the member between said points, and said lines of application of the forces varying in direction relative to said member during its oscillations.

6. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising at least two filaments one of which exerts on said member at one point a force along a line substantially spaced from the center of oscillation of said member and having substantial horizontal and vertical downward components, and the other of which exerts on said member at a point spaced from the first point a second force along another line substantially spaced from the center of oscillation of said member and having substantial horizontal and vertical upward components, said filaments extending laterally from said member, said forces exerting compression upon the portion of the member between said points, and said lines of application of the forces varying in direction relative to said member during its oscillations.

7. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising at least two filaments one of which exerts on said member at one point a force along a line substantially spaced from the center of oscillation of said member and having substantial horizontal and vertical downward components, and the other of which exerts on said member at a point spaced from the first point a second force along another line substantially spaced from the center of oscillation of said member and having substantial horizontal and vertical upward components, said forces exerting compression upon the portion of the member between said points, and said lines of application of the forces varying in direction relative to said member during its oscillations, and means for adjusting a fixed end of at least one of said filaments.

8. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising means for exerting on said member at one point a force along a line substantially spaced from the center of oscillation of said member and having substantial horizontal and vertical downward components, and means for exerting on said member at a point spaced from the first point a second force along another line substantially spaced from the center of oscillation of said member and having substantial horizontal and vertical upward components, said forces exerting compression upon the portion of the member between said points, and said lines of application of the forces varying in direction relative to said member during its oscillations.

9. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising means for exerting on said member at one point a force along a line substantially spaced from the center of oscillation of said member and having substantial horizontal and vertical downward components, and means for exerting on said member at a point spaced from the first point a second force along another line substantially spaced from the center of oscillation of said member and having substantial horizontal and vertical upward components, said forces exerting compression upon the portion of the member between said points, and said lines of application of the forces varying in direction relative to said member during its oscillations, at least one of said force exerting means comprising a filament extending laterally from said member.

10. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising means for exerting on said member at one point a force along a line substantially spaced from the center of oscillation of said member and having substantial horizontal and vertical downward components, and means for exerting on said member at a point spaced from the first point a second force along another line substantially spaced from the center of oscillation of said member and having substantial horizontal and vertical upward components, said forces exerting compression upon the portion of the member between said points, and said lines of application of the forces varying in direction relative to said member during its oscillations, said means comprising a plurality of filaments having fixed ends and means for adjusting the relative position of said fixed ends.

11. An instrument for measuring small variations in gravitational attraction comprising a member subjected to a torque due to a force exerted by gravity, and means for supporting said member for oscillatory movement about an axis spaced from the center of gravity of said member including devices for preventing horizontal movements of said member and for maintaining said member in equilibrium in opposition to said torque, said devices comprising means for exerting on said member at one point a force along a line substantially spaced from the center of oscillation of said member and having substantial horizontal and vertical downward components, and means for exerting on said member at a point spaced from the first point a second force along another line substantially spaced from the center of oscillation of said member and having substantial horizontal and vertical upward components, said forces exerting compression upon the portion of the member between said points, and said lines of application of the forces varying in direction relative to said member during its oscillations, said means comprising a plurality of filaments having fixed ends and means for adjusting the fixed ends of said filaments to change the angular position of a line joining said fixed ends.

MORTON E. MOORE.